(12) United States Patent
Chow et al.

(10) Patent No.: US 10,677,848 B2
(45) Date of Patent: Jun. 9, 2020

(54) APPARATUS, CIRCUIT MODEL, AND METHOD FOR BATTERY MODELLING

(71) Applicants: TOTAL S.A., Courbevoie (FR); NORTH CAROLINA STATE UNIVERSITY, Raleigh, NC (US)

(72) Inventors: Mo-Yuen Chow, Cary, NC (US); Cong Sheng Huang, Raleigh, NC (US); Carlos Carrejo, Paris (FR)

(73) Assignees: TOTAL S.A., Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 361 days.

(21) Appl. No.: 15/612,548

(22) Filed: Jun. 2, 2017

(65) Prior Publication Data

US 2018/0348307 A1 Dec. 6, 2018

(51) Int. Cl.
*G01R 31/367* (2019.01)
*G01R 31/3842* (2019.01)
*G06F 30/367* (2020.01)
*G06F 119/06* (2020.01)

(52) U.S. Cl.
CPC ....... *G01R 31/367* (2019.01); *G01R 31/3842* (2019.01); *G06F 30/367* (2020.01); *G06F 2119/06* (2020.01)

(58) Field of Classification Search
CPC ............ G06F 17/5036; G01R 31/3624; G01R 31/3651; G01R 31/367; G01R 31/3842
See application file for complete search history.

(56) References Cited

U.S. PATENT DOCUMENTS

| 6,515,454 | B2 * | 2/2003 | Schoch | G01R 31/367 |
| | | | | 320/132 |
| 7,683,580 | B2 * | 3/2010 | Matsushima | H02J 7/0047 |
| | | | | 320/132 |
| 2013/0218496 | A1 | 8/2013 | Koch et al. | |

FOREIGN PATENT DOCUMENTS

| CN | 104298793 A | 1/2015 |
| CN | 105044610 A | 11/2015 |

* cited by examiner

*Primary Examiner* — Elias Desta
(74) *Attorney, Agent, or Firm* — Oblon, McClelland, Maier & Neustadt, L.L.P.

(57) ABSTRACT

A method and an apparatus for battery modelling. The method includes acquiring battery information from a sensor attached to a battery, the battery information including at least a terminal voltage and a load current; classifying, the battery information as effective data or ineffective data based on a phase of a battery cycle during which the battery information is acquired; identifying one or more parameters of the circuit model associated with the battery based on the effective data; and generating an estimation of a state of the battery using the circuit model having the one or more parameters identified using the effective data. Further, a circuit model is identified using effective data.

17 Claims, 20 Drawing Sheets

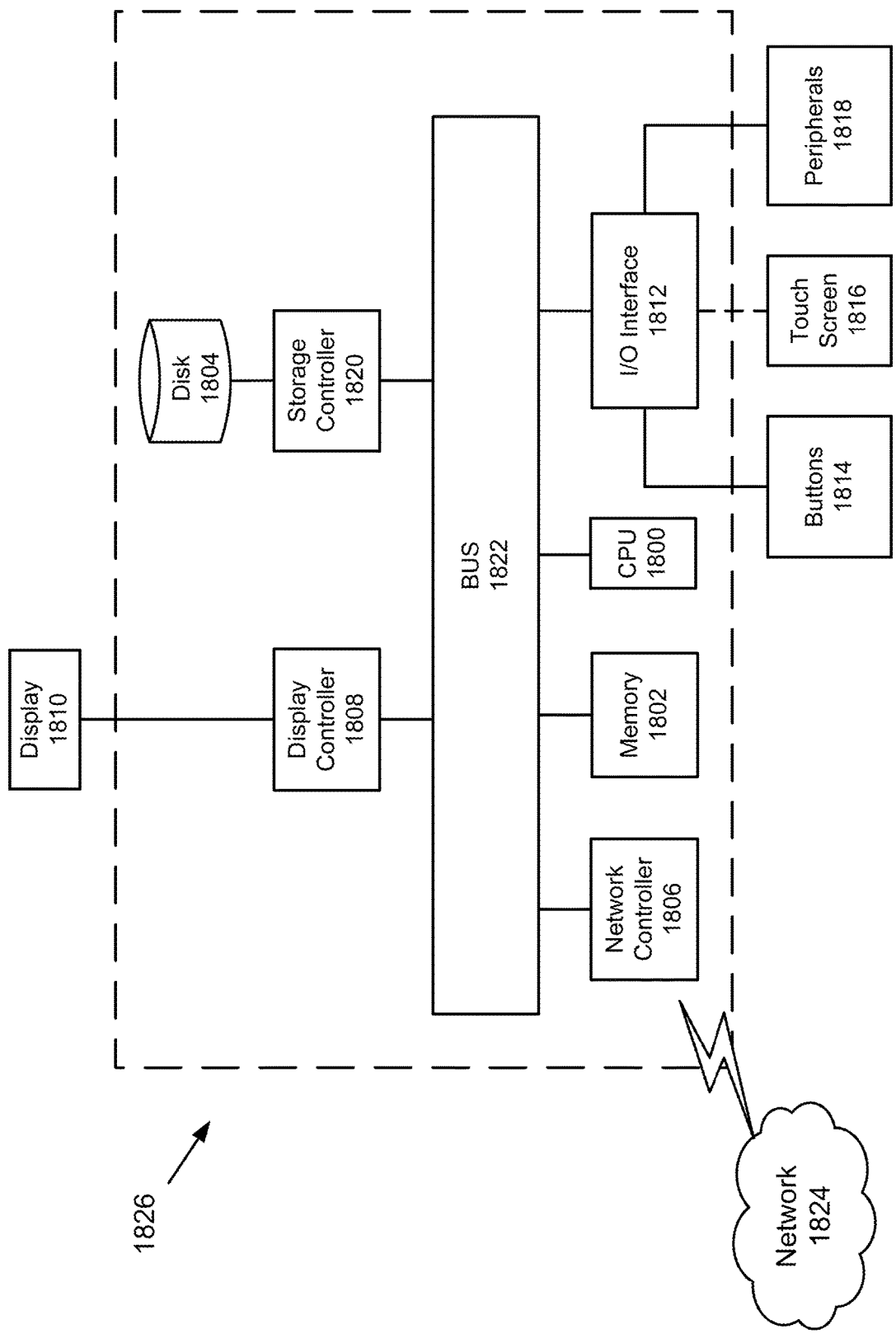

APPARATUS, CIRCUIT MODEL, AND METHOD FOR BATTERY MODELLING

STATEMENT REGARDING FEDERALLY SPONSORED RESEARCH

This invention was made with government support under grant number IIP-1500208 awarded by the National Science Foundation. The government has certain rights in the invention.

BACKGROUND

Battery technologies along with monitoring and management systems for batteries are growing rapidly. Novel chemical compounds have been developed to build higher power and energy density batteries. From application perspectives, there is an ongoing need to develop intelligent algorithms to estimate the state of charge (SOC), state of health (SOH), and state of function (SOF) of batteries with high accuracy and robustness for real-time applications. Many battery models have been developed for different purposes, for example, an electrochemical model, an analytical model, an electric circuit model, etc.

The electrochemical model is known for its accuracy because it describes the chemical reaction inside the battery during charging/discharging. However, the model requires a full knowledge of the specific battery. Thus, it is difficult to use the electrochemical model in real-time applications due to the computation complexity of the model.

The analytical model, which is also known as the Kinetic battery model or the KiBam model, uses the kinetic process to model the chemical process of large lead-acid batteries. However, the analytical model adopts flat discharge profiles, which suits only such large lead-acid batteries, even though the analytical model captures the recovery effect and rate capacity effect.

The electric circuit model, also called Thevenin's circuit model, is commonly adopted to describe a battery characteristic, such as a transient response of a battery.

Algorithms for battery SOC, SOH, SOF estimation include: Coulomb counting as described in C. Y. Chun, J. Baek, G.-S. Seo, B. H. Cho, J. Kim, I. K. Chang, and S. Lee, "Current sensor-less state-of-charge estimation algorithm for lithium-ion batteries utilizing filtered terminal voltage," J. Power Sources, vol. 273, no. 0, pp. 255-263, 2015, observer as described in M. a. Roscher, O. S. Bohlen, and D). U. Sauer, "Reliable state estimation of multicell Lithium-ion battery systems," IEEE Trans. Energy Convers., vol. 26, no. 3, pp. 737-743, 2011, Kalman filter as described in S. Sepasi, R. Ghorbani, and B. Y. Liaw, "A novel on-board state-of charge estimation method for aged Li-ion batteries based on model adaptive extended Kalman filter," J. Power Sources, vol. 245, pp. 337-344, 2014, Fuzzy logic as described in L. Kang, X. Zhao, and J. Ma, "A new neural network model for the state-of-charge estimation in the battery degradation process," Appl. Energy, vol. 121, pp. 20-27, 2014. Most of these algorithms are model-based. Model-based approaches often face a serious problem: how to acquire accurate parameters to build a correct model. Accordingly, what is needed is a method to identify on-line battery measurements that may be used to determine accurate parameters of the model.

The foregoing "Background" description is for the purpose of generally presenting the context of the disclosure. Work of the inventors, to the extent it is described in this background section, as well as aspects of the description that may not otherwise qualify as prior art at the time of filing, are neither expressly or impliedly admitted as prior art against the present invention.

SUMMARY

In one aspect, the present disclosure relates to a method for identification of parameters of a circuit model. The method includes acquiring battery information from a sensor associated with a battery, the battery information including at least a terminal voltage and a load current; classifying, using processing circuitry, the battery information as effective data or ineffective data based on a phase of a battery cycle during which the battery information is acquired; identifying, using the processing circuitry, one or more parameters of the circuit model associated with the battery based on the effective data; and generating, using the processing circuitry, an estimation of a state of the battery using the circuit model having the one or more parameters identified using the effective data.

In another aspect, the present disclosure relates to an apparatus. The apparatus include a sensor configured to acquire battery information from a battery, the battery information including at least a terminal voltage and a load current; and processing circuitry. The processing circuitry is configured to classify the battery information as effective data or ineffective data based on a phase of a battery cycle during which the battery information is acquired, identify one or more parameters of the circuit model associated with the battery based on the effective data, and generate an estimation of a state of the battery using the circuit model having the one or more parameters identified using the effective data.

In yet another aspect, the present disclosure relates to a circuit model for a battery. The circuit model includes one or more electrical components. The one or more electrical components are identified based on effective data, the effective data being classified based on a phase of a battery cycle during which battery information is acquired from a sensor associated with the battery, the battery information including at least a terminal voltage and a load current.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18 is an exemplary block diagram of a computer according to one example.

DETAILED DESCRIPTION

Figure 1:
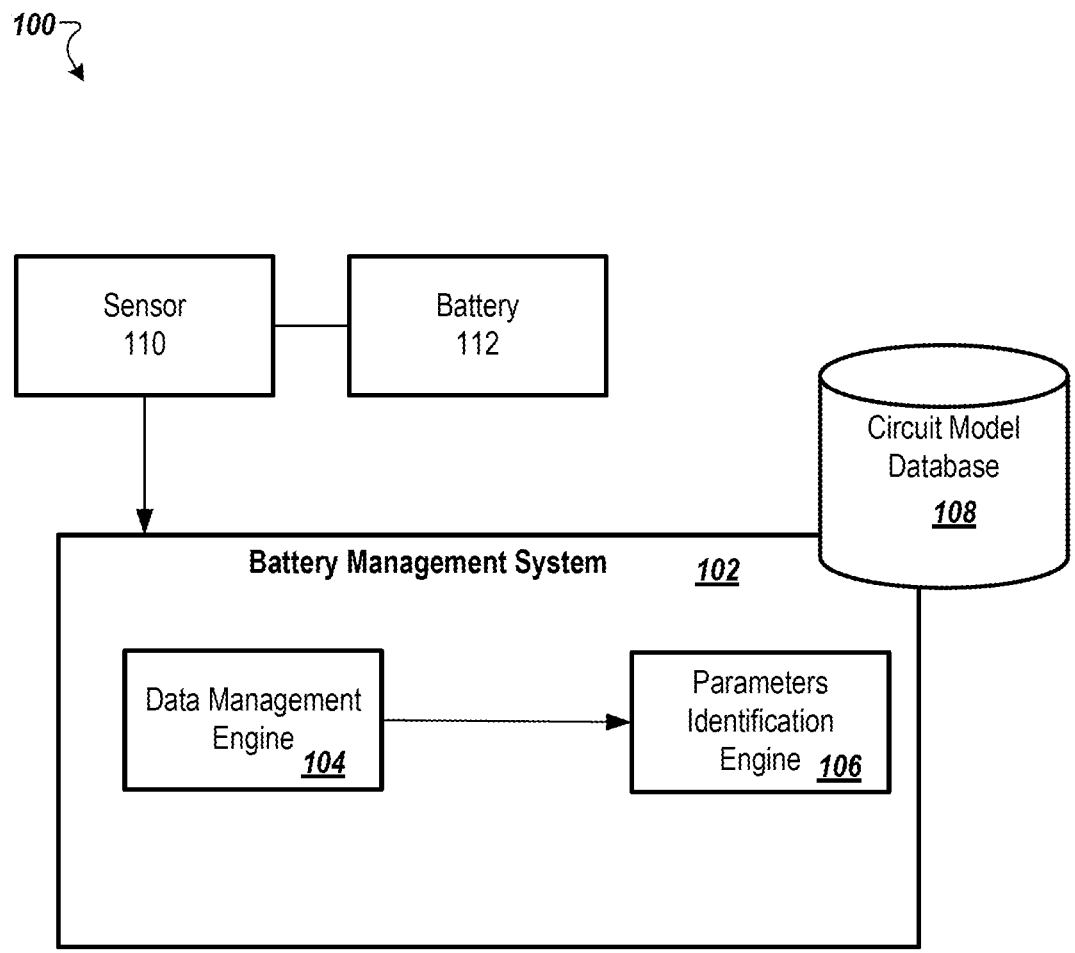
FIG. 1 is an exemplary diagram of an example environment for a battery management system.

Referring now to the drawings, wherein like reference numerals designate identical or corresponding parts throughout several views, the following description relates to an apparatus, a circuit model, and associated methodology for battery modelling in real-time.

The circuit model (i.e., the electric circuit model) described herein is suitable to be used for estimating a state of charge (SOC), state of health (SOH), and state of function (SOF) in real-time operations with a good tradeoff between computation complexity and accuracy. Described herein is a method that uses a condition number to identify effective on-line battery measurements in order to acquire accurate parameters of the circuit model, which in turn can significantly improve the accuracy of model-based SOC, SOH, SOF estimations.

FIG. 1 is an exemplary diagram of an example environment 100 for a battery management system 102. The battery management system 102 may include a data management engine 104 and a parameters identification engine 106. The battery management system 102 may also include a circuit model database 108.

The data management engine 104 and the parameters identification engine 106 may be implemented as either software and/or hardware modules and may be stored in any type of computer-readable medium or other computer storage device. For example, each of the engines described herein may be implemented in circuitry that is programmable (e.g. microprocessor-based circuits) or dedicated circuits such as application specific integrated circuits (ASICS) or field programmable gate arrays (FPGAS). In some implementations, the processes associated with each of the engines may be performed by one or more processors of a server, a computer, or other computing resources, which can include cloud computing resources. For example, the processes may be performed by a computer 1826 shown in FIG. 18. The computer 1826 may include a CPU 1800 and a memory 1802 as shown in FIG. 18.

In one implementation, the circuit model database 108 may be implemented in the memory 1802 of the computer 1826.

The data management engine 104 may identify effective (i.e., valid) data based on battery information sensed by a sensor 110. The sensor 110 detects informnnation regarding a battery 112. The battery information may include, for example, a voltage of a battery, a current, such as the current to and from the battery 112. The sensor 110 may include a voltmeter, an ammeter, or other electric circuit components, but the types of sensor 110 are not limited thereto. Effective data are data that may result in accurate (i.e., correct) determination of parameters (i.e., components) of the circuit model. Ineffective data include data that may result in inaccurate determination of the parameters of the circuit model. For example, using ineffective data to determine a capacitance value of the circuit model may result in large errors in the identification of the capacitance value. Inaccurate parameters result in an inaccurate circuit model which, in turn, leads to inaccurate controlling and monitoring of the battery 112.

The identification may be based on an equivalent model of the battery 112 such as the circuit model. The data management engine 104 may output the effective data to the parameters identification engine 106. The parameter identification engine 106 may identify the parameters of the circuit model using a typical parameter identification scheme, a lookup table, or the like.

The circuit model database 108 may store the equivalent model of the battery 112. For example, the circuit model database may store the number of RC pairs (e.g., one RC) used in the equivalent model and the order of a transfer function associated with the circuit model as described later herein.

In one implementation, the battery 112 may be a part of a home energy management system. The battery 112 may be used to supply power when the cost of electricity is high and be recharged when the cost is low. A precise estimation of the SOC and SOH of the battery 112 in turn provides for an optimal operation of the battery 112. The battery management system 102 may identify accurately parameters of the circuit model using effective data. The circuit model represents the battery accurately and in real-time. In one implementation, the battery 112 may be a part of a building energy management system at a commercial building, a residential building, or an industrial building.

In one implementation, the method described herein may be used in a power microgrid system that includes renewable energy sources and at least the battery 112. Further, the microgrid system may be a hybrid microgrid that includes renewable energy sources, the battery 112, and a second energy source such as a diesel/gas generator.

In one implementation, the method described herein may be applied in aggregated distributed energy resources systems that include electric battery storage in a commercial building, an industrial building, or a residential building or a home.

In one implementation, the battery 112 may be a part of any device that is powered by a battery. For example, the device may be an electronic device such as a laptop, smartphone, cellphone, tablet, watch, health bracelet, and the like. The battery 112 may be a part of a portable power tool (e.g., drills, saws, sanders and heat guns).

In one implementation, the battery 112 may be a part of an aerospace structure such as a satellite, an aircraft, a spacecraft, and other space vehicles.

In one implementation, the battery 112 may include a battery in an electric vehicle. In another example, the battery may be a large-capacity battery bank used in a data center or a smart grid.

Figure 2:
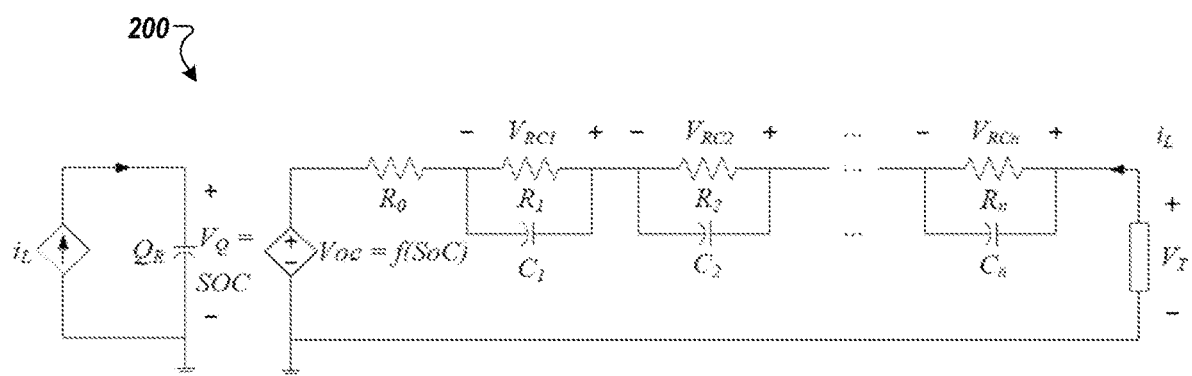
FIG. 2 is an exemplary diagram of a Thevenin's circuit model corresponding to a battery according to one example.

FIG. 2 is a schematic that shows a Thevenin's circuit model 200 according to one example. A typical battery Thevenin's circuit model includes one DC resistance, $R_0$, and one ($R_1C_1$) as described in W. Waag, C. Fleischer, and D. U. Sauer, "Critical review of the methods for monitoring of lithium-ion batteries in electric and hybrid vehicles," J. Power Sources, vol. 258, pp. 321-339, 2014, two ($R_1C_1$, $R_2C_2$) as described in L. Pei, T. Wang, R. Iu, and C. Zhu, "Development of a voltage relaxation model for rapid open-circuit voltage prediction in lithium-ion batteries," J. Power Sources, vol. 253, pp. 412-418, 2014, to multiple RC pairs to describe the dynamic of the terminal voltage. More RC pairs capture more terminal voltage dynamics, while increasing the computation complexity. The more RC pairs used in turn increase the number of states to be used in a corresponding state-space model, and therefore increase an order of a corresponding transfer function associated with the state-space model.

The circuit model described herein uses a one RC pair model to illustrate a condition number based measurement selection for battery parameter identification. In other implementations, two or more RC pairs may be used. The one RC pair model captures the terminal voltage dynamic in terms of seconds to minutes, and is suitable to be used for SOC estimation on electric vehicle (EV), hybrid plugged-in electric vehicle (HPEV) real-time operations, and the like.

Figure 3:
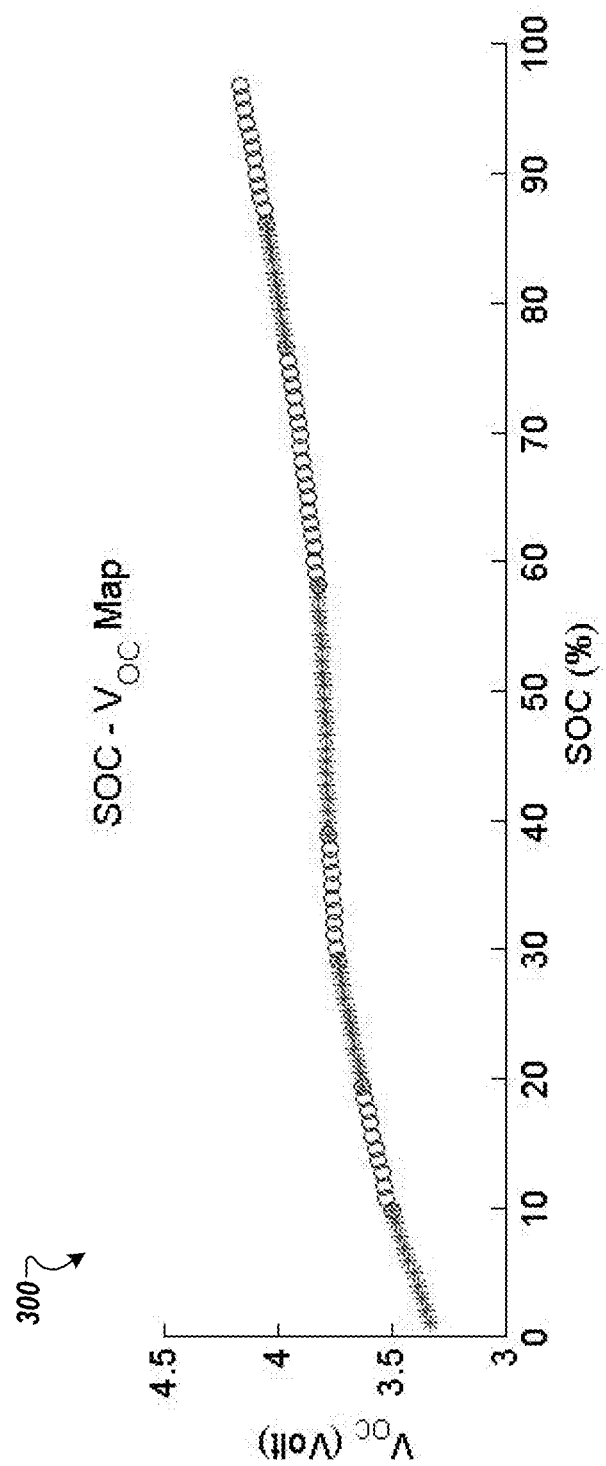
FIG. 3 is a schematic that shows a state of charge (SOC)-open circuit voltage ($V_{OC}$) map according to one example.

An exemplary open-circuit voltage ($V_{OC}$) and SOC relation, $V_{OC}(SOC)$, of a battery is shown in FIG. 3. Schematic 300 shows a nonlinearity, which may be a challenge if linear system theory is applied for battery modeling, parameter identifications, state estimation, and control. In FIG. 3, the x-axis represents a battery state of charge. The y-axis represents the open-circuit voltage.

Figure 4:
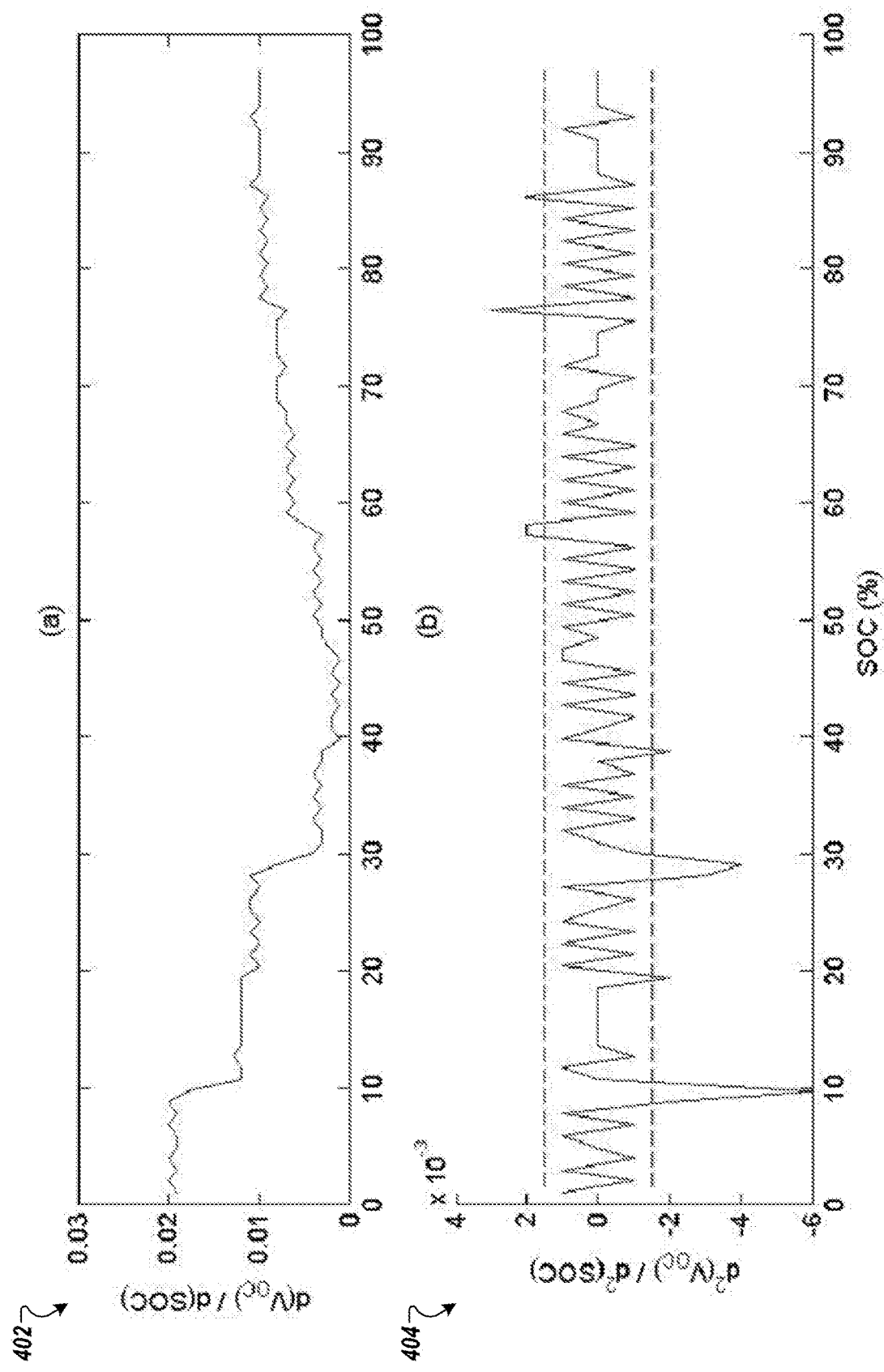
FIG. 4 is a schematic that shows a first and a second derivative of the $V_{OC}$ versus SOC map according to one example.

The model described herein approximates the nonlinear function $V_{OC}(SOC)$ with a set of piece-wise linear functions over the SOC operating range as described in H. Rahimi-Eichi, F. Baronti, and M. Y. Chow, "Online adaptive parameter identification and state-of-charge coestimation for lithium-polymer battery cells," IEEE Trans. Ind. Electron., vol. 61, no. 4, pp. 2053-2061, 2014. The SOC-$V_{OC}$ curve can be separated into eight linear segments as shown in FIG. 4 by the second derivative of $V_{OC}$ versus SOC map. In FIG. 4, the x-axis represents the battery state of charge. In schematic 402, the y-axis represents a first derivative of the open-circuit voltage shown in FIG. 3. In schematic 404, the y-axis represents a second derivative of the open-circuit voltage.

The $V_{OC}$(SOC function is separated by a set of linearized function as:

$$V_{OC} = f(SOC) = \begin{cases} b_{0,1} + b_{1,1}SOC, & SOC_0 \le SOC \le SOC_1 \\ b_{0,2} + b_{1,2}SOC, & SOC_1 \le SOC \le SOC_2 \\ \vdots \\ b_{0,N} + b_{1,N}SOC, & SOC_{N-1} \le SOC \le SOC_N, SOC_1 < SOC_2 < \ldots < SOC_N \end{cases} \quad (1)$$

where $b_{0,i}$ and $b_{1,i}$ are the linear equation coefficients to be identified. SOC may be related to load current $I_L$ and the battery capacity $Q_R$ as:

$$SOC*Q_R = f(I_t) = \int I_L dt \quad (2)$$

Thus, the dynamics of the SOC and $V_{OC}$ can be described by the following two first order differential equations:

$$\dot{SOC} = \frac{1}{Q_R} I_L \quad (3)$$

$$\dot{V}_{OC} = b_1 \dot{SOC} = \frac{b_1}{Q_R} I_L \quad (4)$$

Based on the Kirchhoff's Law, the voltage between the RC pair, $V_{RC}$, and the terminal voltage, $V_T$, can be represented as:

$$I_{C_1} = C \dot{V}_{RC}, \quad (5)$$

$$V_{RC} = (I_L - C\dot{V}_{RC})R, \quad (6)$$

$$V_T = I_L R_0 + V_{RC} + V_{OC}. \quad (7)$$

In one implementation, $[V_{OC} \ V_{RC}]^T$ may be selected as state, and the state-space model of the circuit can be represented in standard Linear Time Invariant (LTI) form $\dot{x}$=Ax+Bu, y=Cx+Du as:

$$\begin{bmatrix} \dot{V}_{OC} \\ \dot{V}_{RC} \end{bmatrix} = \begin{bmatrix} 0 & 0 \\ 0 & -1/R_1 C_1 \end{bmatrix} \begin{bmatrix} V_{OC} \\ V_{RC} \end{bmatrix} + \begin{bmatrix} b_1/Q_R \\ 1/c_1 \end{bmatrix} I_L \quad (8)$$

$$V_T = \begin{bmatrix} 1 & 1 \end{bmatrix} \begin{bmatrix} V_{OC} \\ V_{RC} \end{bmatrix} + R_0 I_L \quad (9)$$

where $A = \begin{bmatrix} 0, 0; 0, \frac{-1}{R_1 C_1} \end{bmatrix}$, $B = \begin{bmatrix} \frac{b_1}{Q_R}, \frac{1}{C_1} \end{bmatrix}^T$, $C = [1, 1], D = R_0$.

For each i-th linearized region, the continuous-time transfer function can be derived as described in R. Isermann, Fault-diagnosis systems: an introduction from fault detection to fault tolerance, Springer Science & Business Media, 2006. The subscript i is skipped for simplicity purposes in the following, and all the derivations are for each i-th region:

$$H(s) = C(sI - A)^{-1}B + D = \quad (10)$$

$$\frac{Y(s)}{U(s)} = \frac{V_T(s)}{I_L(s)} = \frac{R_0 s^2 + \left(\frac{R_0}{RC} + \frac{b_1}{Q_R} + \frac{1}{C}\right)s + \frac{b_1}{RCQ_R}}{s^2 + \frac{1}{RC}s}.$$

Linear regression analysis in discrete-time domain is used to perform parameter identification of the battery model. The continuous-time transfer function is transformed into a discrete-time domain with a bilinear transform $$\left(s \rightarrow \frac{2}{T}\frac{z-1}{z+1}\right),$$

where T is the sampling time. In one implementation, T is set to T=1 second.

$$H(z) = \frac{Y(z^{-1})}{U(z^{-1})} = \frac{c_0 + c_1 z^{-1} + c_2 z^{-2}}{1 + a_1 z^{-1} + a_2 z^{-2}}. \quad (11)$$

Once the coefficients ($c_0$, $c_1$, $C_2$, $a_1$, $a_2$) of the discrete-time transfer function are identified, the bilinear transfer function may be used to transfer the discrete-time transfer function back to the continuous-time domain. Hence, the value of the components in the electric circuit model (e.g., electric model shown in FIG. 2) can be acquired from the continuous time transfer function. Linear regression analysis may be also used to identify coefficients of the transfer function as described in K. J. Åstrom and B. Wittenmark, *Adaptive control*, Courier Corporation, 2013. The linear system in equation (11) can be rewritten in an autoregressive-moving average, ARMA, model:

$$y(k)+a_1 y(k-1)+\square+a_n y(k-n)=c_0 u(k)+c_1 u(k-1)+\square+c_m u(k-m) \quad (12)$$

or, $$y(k)=-a_1 y(k-1)-\square-a_n y(k-n)+c_0 u(k)+c_1 u(k-1)+\square+c_m u(k-m) \quad (13)$$

The output y(k) may be expressed as the multiplication of coefficient matrix ($\theta$) and regression matrix (J) as:

$$y(k)=\theta(k)J(k) \quad (14)$$

with:

$$J(k)=[-y(k-1),-y(k-2),\square,-y(k-n),u(k),u(k-1),\square,u(k-m)]$$

$$\theta(k)=[a_1 a_2 \square a_n c_0 c_1 \square c_m]^T=(J(k)^T J(k))^{-1}J(k)y(k). \quad (15)$$

The linear regression matrix may be used to find the coefficients of the transfer function. However, the ability to find accurate coefficient values can depend on many factors such as whether the data set used contains sufficient information for identification purposes.

The model and methodologies described herein use the condition number as an indicator on what type of data can be used to perform the parameter identification of a battery model (e.g., the circuit model). The condition number, $\kappa$, representing an accuracy of computing J−1 given a J, may be defined as the product of two matrices norms, $\|J\|$ and $\|J^{-1}\|$ as:

$$\kappa(J)=\|J^{-1}\|\cdot\|J\|. \quad (17)$$

When $\kappa(J)$ is small, J is well-conditioned, and $J^{-1}$ can be determined with high accuracy. In turn, the coefficient matrix (e.g., given by equation (15)) can be determined with high accuracy. Therefore, the parameters of the circuit model may also be determined accurately (e.g., using equations (10) and (11)). Therefore, data resulting in a well-conditioned J are effective data. Conversely, J with large $\kappa(J)$ is called ill-conditioned. Ill-conditioned matrices usually are close to singular and give large computational errors for inverse calculation. Therefore, the coefficient matrix and, in turn, the parameters of the circuit model are inaccurate. Data resulting in an ill-conditioned matrix are ineffective data for the purpose of parameters identification of the circuit model. To build an accurate model for model-based algorithm as described previously herein, correct parameter values determination is important. It is important to efficiently distinguish effective data and ineffective data for the battery parameter identification in real-time. The charging/discharging time responses may be separated into four different time regions based on the nature of the charging/discharging cycles, and then the condition number of the data set collected in each time region is used to identify effective data sets for battery parameter identification.

As an example, a 2.1 Ah battery is discharged from fully charged to fully discharged in 20 cycles. The battery discharges 5% of its SOC in every cycle. For example, FIG. 5 shows SOC, load current ($I_L$), and terminal voltage ($V_T$) of one cycle.

Figure 5:
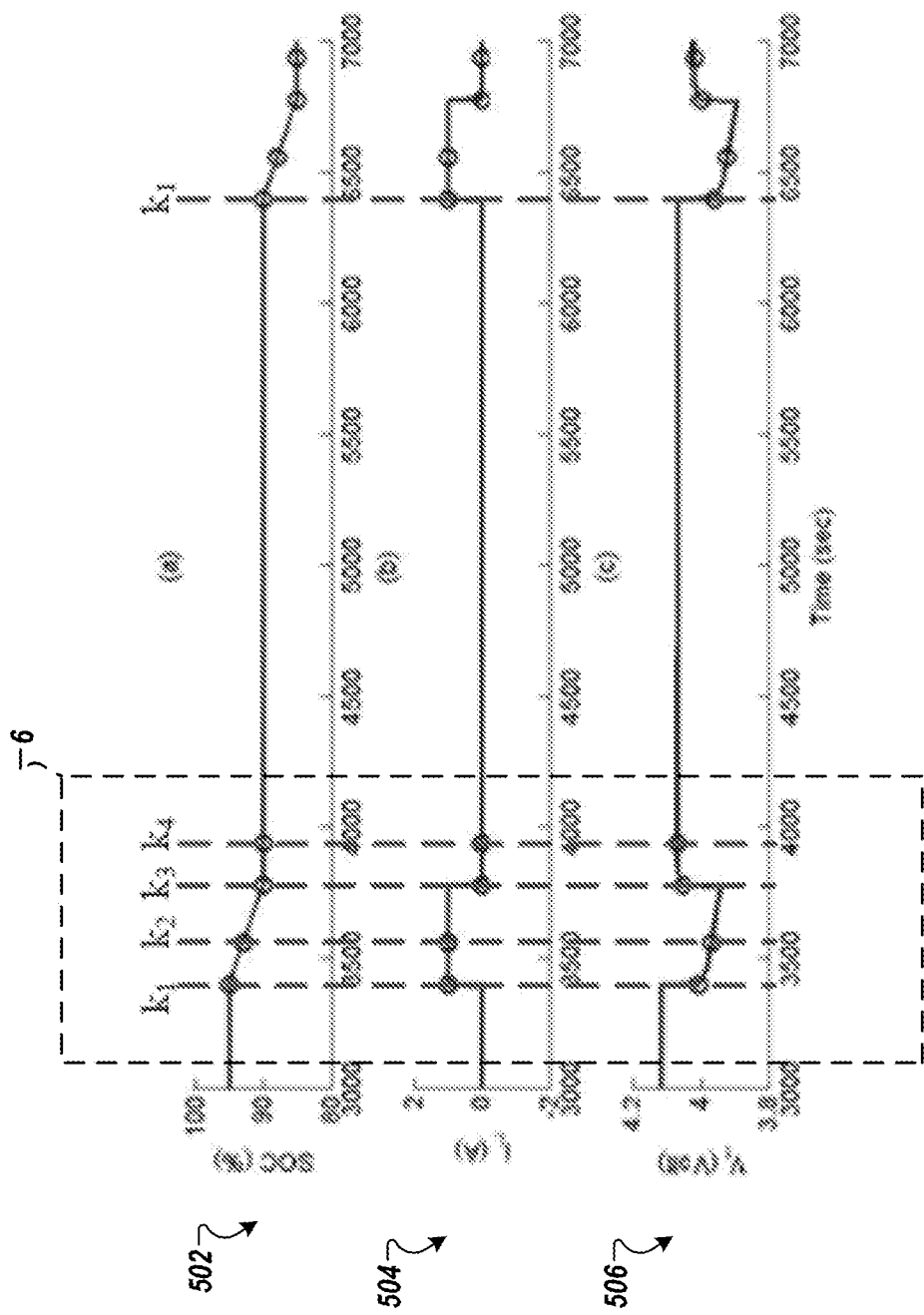
FIG. 5 is a schematic that shows a SOC profile, a load current profile, and a voltage profile according to one example.

The charging/discharging cycle may be separated into four regions, $D_1$, $D_2$, $D_3$, and $D_4$ as shown in FIG. 5 by four time stamps $k_1$, $k_2$, $k_3$, and $k_4$, respectively. In FIG. 5, the x-axis represents a time in seconds. In graph 502, the y-axis represents a battery state of charge (SOC). In graph 504, the y-axis represents a load current profile. In graph 506, the y-axis represents a load voltage profile.

Figure 6A:
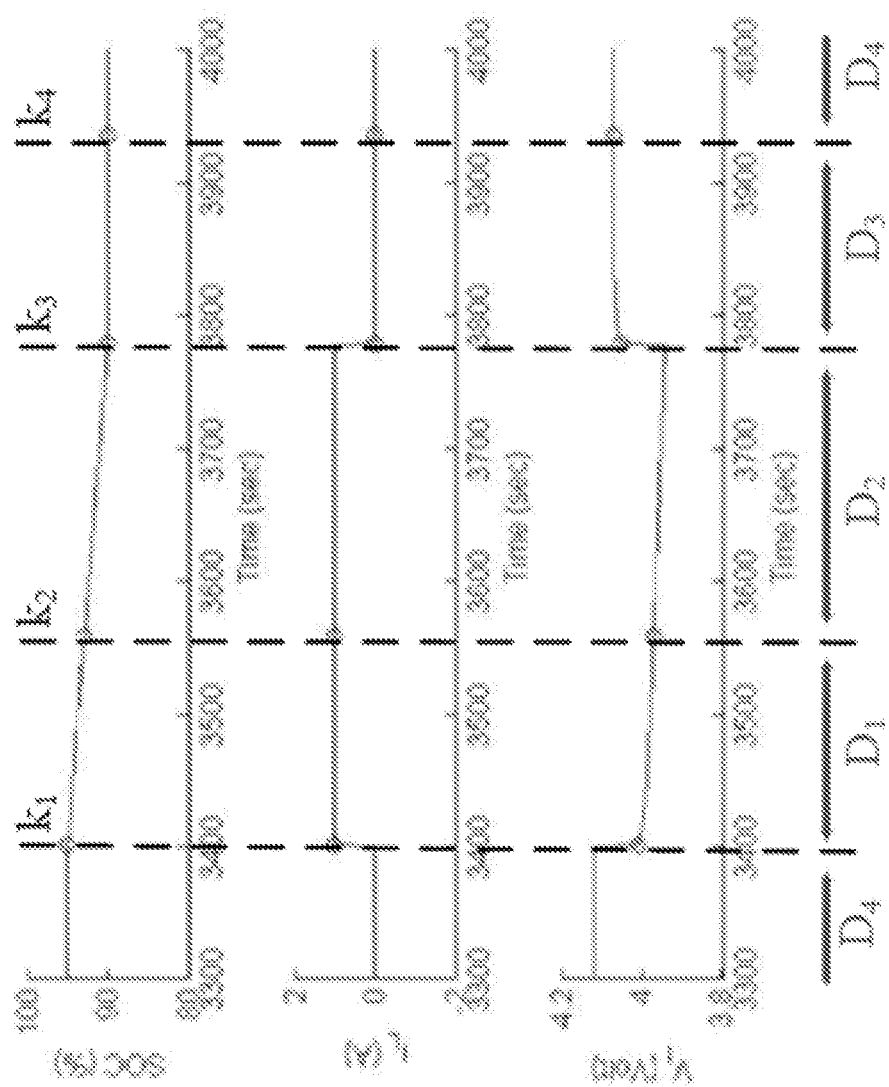
FIG. 6A is a schematic that shows a magnified view of the SOC profile, the load current profile, and the voltage profile during a discharging cycle.

FIG. 6A is a schematic that shows a magnified view of the discharging cycle of FIG. 5. The battery is discharged with a constant load current 1A for 378 seconds in period $D_1$, which discharges the battery by 5% of its SOC. The load current (i.e., discharge current in a discharging cycle) represents a current flowing from the battery to a load (e.g., resistor). After discharging the battery, the battery rests for at least 30 mins as described in M. A. Roscher and D. U. Sauer, "Dynamic electric behavior and open-circuit-voltage modeling of LiFePO4-based lithium ion secondary batteries," *J. Power Sources, vol.* 196, no. 1, pp. 331-336, 2011, and is denoted $D_2$. One discharge cycle is 50 minutes.

Figure 7A:
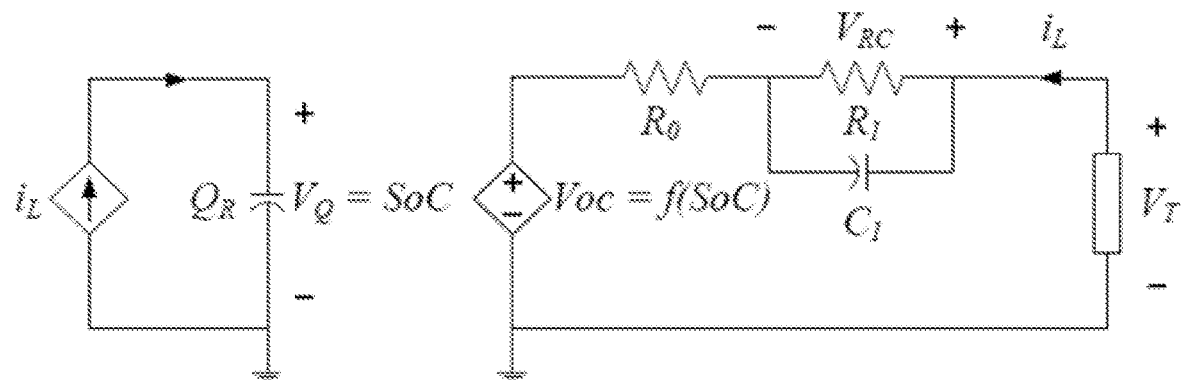
FIG. 7A is a schematic that shows the Thevenin's equivalent circuit model in a first phase of a battery cycle.

Data belonging to the $D_1$ region are effective data and can use linear approximation to acquire the parameters (i.e., components) because the condition number is low in $D_1$. Exemplary condition numbers are listed in Table 1. In the $D_1$ region, the battery is connected to a constant load current, and completes a loop to discharge as shown in FIG. 7A. $R_0$ consumes most of the energy and makes an Ohmic drop at the beginning of the discharge cycle. The RC pair provides the transient of the terminal voltage profile because the $C_1$ of the RC pair is charging in the $D_1$ region. All the electric components (e.g., resistor and RC pair) contribute to the terminal voltage profile, therefore, all the parameters can be identified in the $D_1$ region. Note that the identification of the parameters may need at least three past effective data (i.e., three measurements captured by the sensor 110 and determined as effective by the data management engine 104) to capture the Ohmic drop in the terminal voltage profile (i.e., the effect of $R_0$), when a second order linear regression approach is used. In other words, the data management engine 104 may capture a predetermined number of effective data based on the order of linear regression approach.

TABLE 1

Condition number in different regions for different SOC

| SOC | $D_1$ | $D_2$ | $D_3$ | $D_4$ |
|---|---|---|---|---|
| 0.00 | 50958 | 34554716173194300000 | 49695 | Inf. |
| 0.05 | 52197 | 42048768976985700000 | 50944 | Inf. |
| 0.10 | 53197 | 6895897406297550000 | 51815 | Inf. |
| 0.15 | 53684 | 8055074687891220000 | 52252 | Inf. |
| 0.20 | 53750 | 3645740863232120000 | 52230 | Inf. |
| 0.25 | 53473 | 3438977657624170000 | 52013 | Inf. |
| 0.30 | 53114 | 14659978942349200000 | 51716 | Inf. |
| 0.35 | 52812 | 44026105942697600000 | 51424 | Inf. |
| 0.40 | 52552 | 30426597540581600000 | 51186 | Inf. |
| 0.45 | 52216 | 13426687414277500000 | 50895 | Inf. |
| 0.50 | 51523 | 15283905479633800000 | 50300 | Inf. |
| 0.55 | 50373 | 8557337570240510000 | 49237 | Inf. |
| 0.60 | 48747 | 129069785643046000000 | 47514 | Inf. |
| 0.65 | 46659 | 24239365849927000000 | 45430 | Inf. |
| 0.70 | 44401 | 36488609763394800000 | 43089 | Inf. |
| 0.75 | 42056 | 52100298898659000000 | 40644 | Inf. |
| 0.80 | 39669 | 3921036994977210000 | 38294 | Inf. |
| 0.85 | 37265 | 37661357509331800000 | 36018 | Inf. |
| 0.90 | 34832 | 3366299089400070000 | 33488 | Inf. |
| 0.95 | 32118 | 1744889459158210000 | 29977 | Inf. |

Figure 7B:
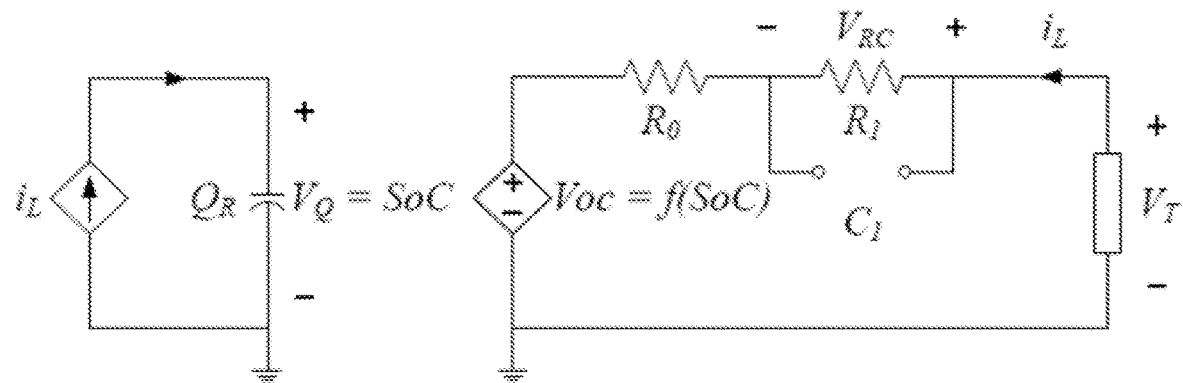
FIG. 7B is a schematic that shows the Thevenin's equivalent circuit model in a second phase of the battery cycle.

A second region $D_2$ is defined as $\forall k \in D_2$, $D_2 = \{k_2 \leq k < k_3\}$. In the $D_2$ region, the linear regression approach fails to identify parameters as the condition number is very large. The condition numbers in $D_2$ can be found in Table 1. In the $D_2$ region, the $C_1$ of the pair RC is fully charged. The reactance of this capacitance is infinity. In other words, the connection to the $C_1$ of the RC pair is opened as shown in FIG. 7B. Only $R_0$ and $R_1$ affect the terminal voltage profile, and strictly follow the Ohm's law. Therefore, the model of the $D_2$ region is a linear transfer function and may be expressed as:

$$V_R = V_{OC} - R_{all} i_L. \quad (18)$$

where $R_{all} = R_0 + R_1$. Note that Rail in the $D_2$ region cannot be decomposed into $R_0$ and $R_1$.

A third region for the cycle is a nonlinear relaxation region and may be defined as $\forall k \in D_3$, $D_3 = \{k_3 - 3 \leq k < k_4\}$.

Figure 7C:
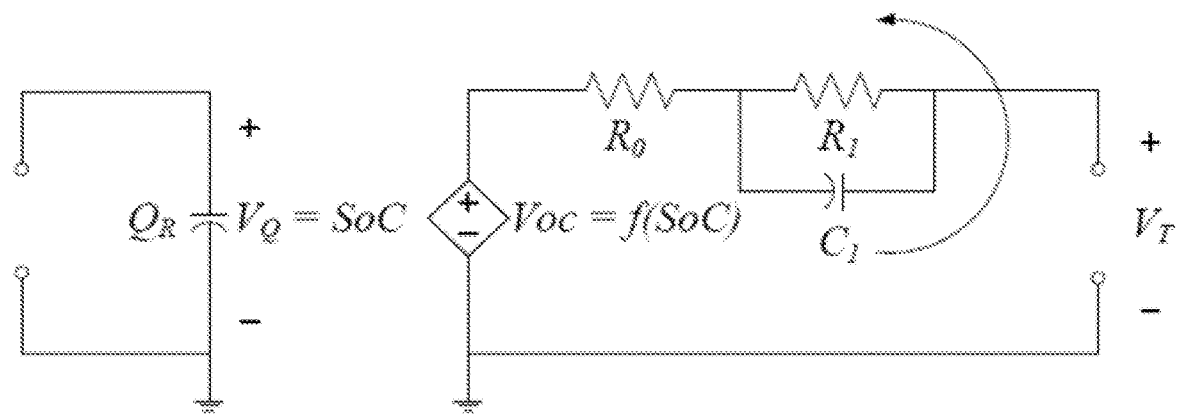
FIG. 7C is a schematic that shows the Thevenin's equivalent circuit model in a third phase of the battery cycle.

The linear characteristic of terminal voltage profile ends once the battery disconnects with load. All the parameters of the $D_3$ region can be identified and the condition number is small. The condition number can be found in Table 1. Once the circuit is open as shown in FIG. 7C, the battery starts to relax. $C_1$ of the RC pair starts to discharge and provides an excitation to the terminal voltage.

Figure 7D:
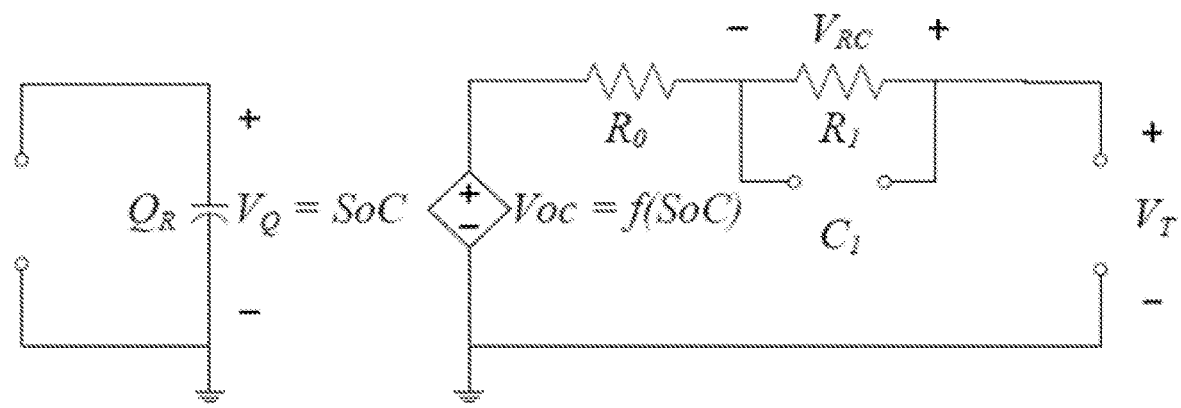
FIG. 7D is a schematic that shows the Thevenin's equivalent circuit model in a fourth phase of the battery cycle.

A fourth region $D_4$ is defined $\forall k \in D_4$, $D_4 = \{k_4 \leq k < \text{next } k_1\}$. Once $C_1$ of the RC pair is fully discharged, the battery goes to the $D_4$ region. The $D_4$ region may also be referred to as the deep relaxation period. All the electric components cannot be identified because the lack of excitation signal and the condition number is infinity as shown in Table 1. There is no chemical reaction inside the battery until the next charge/discharge operation. Therefore, SOC remains constant without any change. Terminal voltage, which is same as $V_{OC}$, also remains constant. The circuit model for the fourth region is shown in FIG. 7D.

Figure 6B:
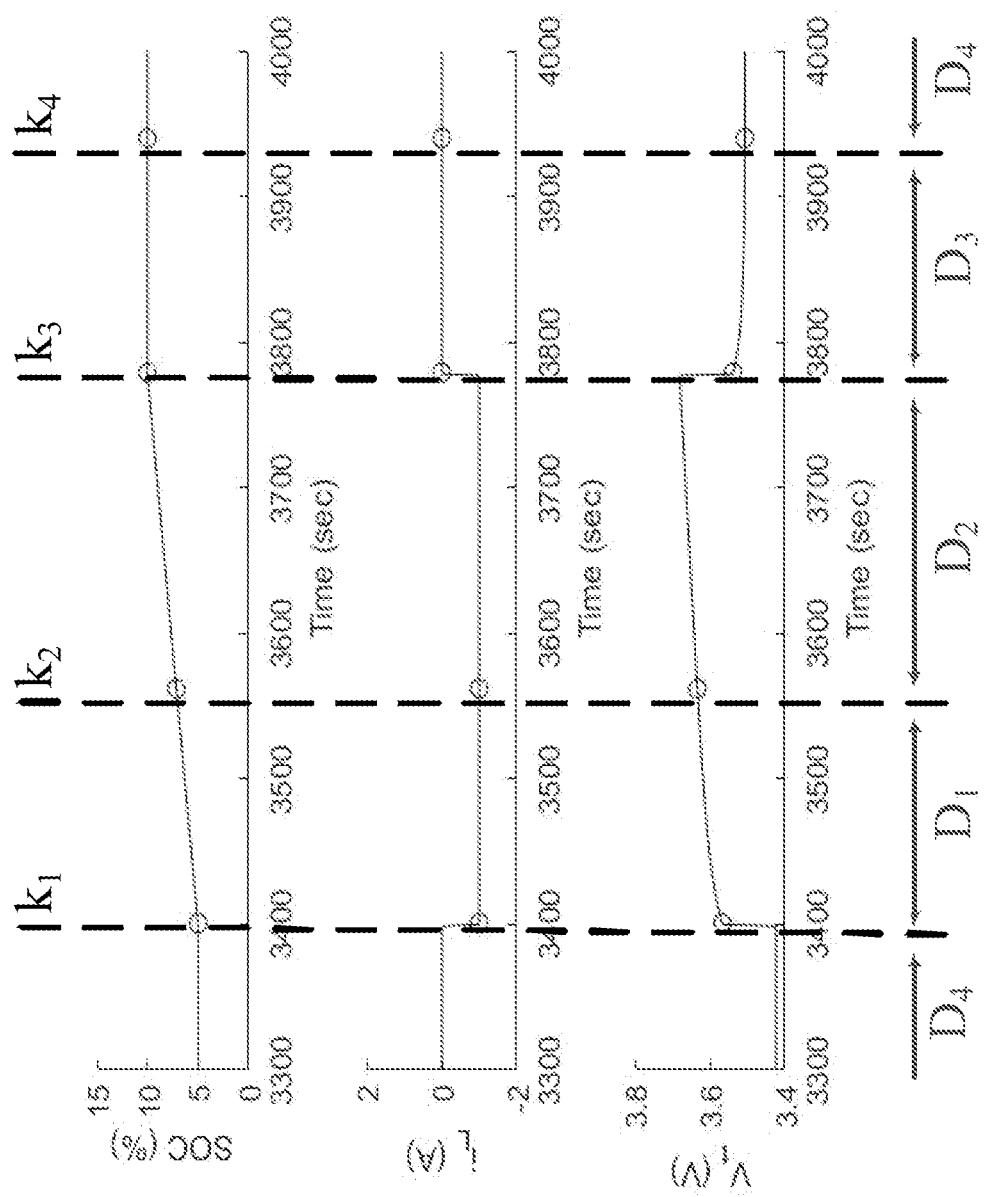
FIG. 6B is a schematic that shows the SOC profile, the load current profile, and the voltage profile during a charging cycle.

FIG. 6B is a schematic that shows the SOC profile, the load current profile, and the voltage profile during a charging cycle. The charging cycle may also be divided into the four regions ($D_1$, $D_2$, $D_3$ and $D_4$) described previously herein. The load current (i.e., charge current) has an opposite sign from FIG. 6A (discharging) and the terminal voltage increases in $D_1$ and $D_2$. The circuit model for the $D_1$, $D_2$, $D_3$ and $D_4$ regions are shown in FIGS. 7A-7D, respectively.

Figure 8:
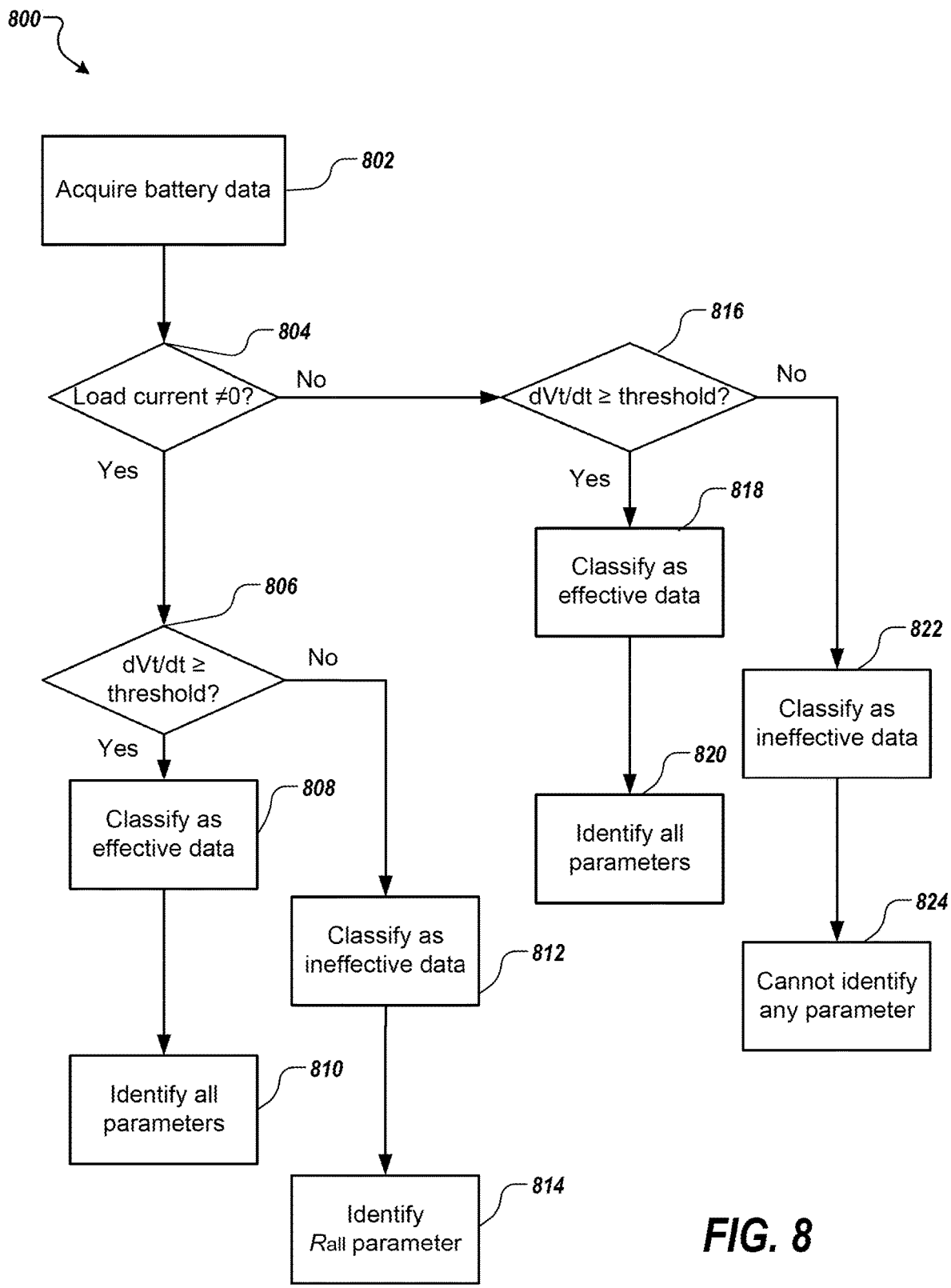
FIG. 8 is a flowchart of a method for identifying effective data according to one example.

FIG. 8 is a flowchart of a method 800 for identifying effective data according to one example. The method 800 may be executed by the data management engine 104.

At step 802, the data management engine 104 may acquire battery information from the battery 112. The battery information may include a load current and a terminal voltage at various time instances. At step 804, the data management engine 104 may check whether the load current is different from zero. In response to determining that the load current is not zero, the process proceeds to step 806. In response to determining that the load current is equal to zero, the process proceeds to step 816.

At step 806, a derivative of the terminal voltage dV/dt is calculated. Then, the derivative is compared with a predetermined threshold ($dkV_t/dt$). The predetermined threshold may be predetermined using experimental results and stored in database 108. The predetermined threshold may be based on a desired linearity of the region (i.e., a smaller threshold may lead to very linear region). In one implementation, the predetermined threshold may be $10^{-7}$ Volt/sec. The predetermined threshold may be a function of a type of the battery and operating conditions (e.g., age of the battery, temperature). Thus, the predetermined threshold may be a tunable parameter. In one implementation, the predetermined may be input by a user. In other implementations, the predetermined threshold may be automatically determined based on the operating conditions. In response to determining that the derivative is higher than the predetermined threshold, the process proceeds to step 808. In response to determining that the derivative is below the predetermined threshold, the process proceeds to step 812.

At step 808, the data (i.e., a load current and terminal voltage) is classified as effective data. The data belongs to the $D_1$ region. At step 810, the data management engine 104 may output the data to the parameter identification engine 106 to identify all the parameters of the circuit model.

At step 812, the data is classified as ineffective data. The ineffective data may be discarded. In one implementation, the data may be outputted to the parameters identification engine 106 to identify a parameter associated with $R_{all}$ of the circuit model. The data belongs to the $D_2$ region.

At step 816, a derivative of the terminal voltage dV/dt is calculated. Then, the derivative is compared with the predetermined threshold (dV/dt). In response to determining that derivative is greater than the predetermined threshold, the process proceeds to step 818. In response to determining that the derivative is below the predetermined threshold, the process proceeds to step 822.

At step 818, the data is classified as effective data. At step 820, the data management engine 104 may output the data to the parameter identification engine 106 to identify all the parameters. The data belongs to the $D_3$ region.

At step 822, the data is classified as ineffective data. The data are associated with the fourth region. The ineffective data may be discarded. As described previously herein, data associated with the fourth region (i.e., fourth phase of the battery cycle) are ineffective data which leads to high errors if used to identify parameters of the circuit model.

In order to validate the condition number based parameter identification described herein under a fully controlled enviromnent, the inventors performed model simulations. A circuit model based battery simulator, Simulink, was used to represent an actual battery. The battery parameter values were acquired from H. Rahimi-Eichi, F. Baronti, and M. Y.

Chow, "Online adaptive parameter identification and state-of-charge coestimation for lithium-polymer battery cells," *IEEE Trans. Inc. Electron.*, vol. 61, no. 4, pp. 2053-2061, 2014. The results show the identification of the parameters (i.e., $R_0$, $R_1$, $C_1$) of the circuit model using data acquired in regions $D_1$, $D_2$, $D_3$, and $D_4$.

FIGS. 9-12 show the nonlinear relationships between $R_0$, $R_1$, $C_1$, $R_1C_1$, and SOC, respectively. The separation of the effective and ineffective data is based on using different regions, as described previously herein. As an example, the parameters ($R_0$, $R_1$, $C_1$, and $R_1C_1$ constant) are assumed to remain constant, zero order hold (ZOH), in each discharge cycle as shown by traces 906, 1006, 1106, and 1206 in FIGS. 9-12, respectively. The ZOH error with respect to the real value is smaller than 6%, which is small enough to be adopted for the model described herein.

Figure 9:
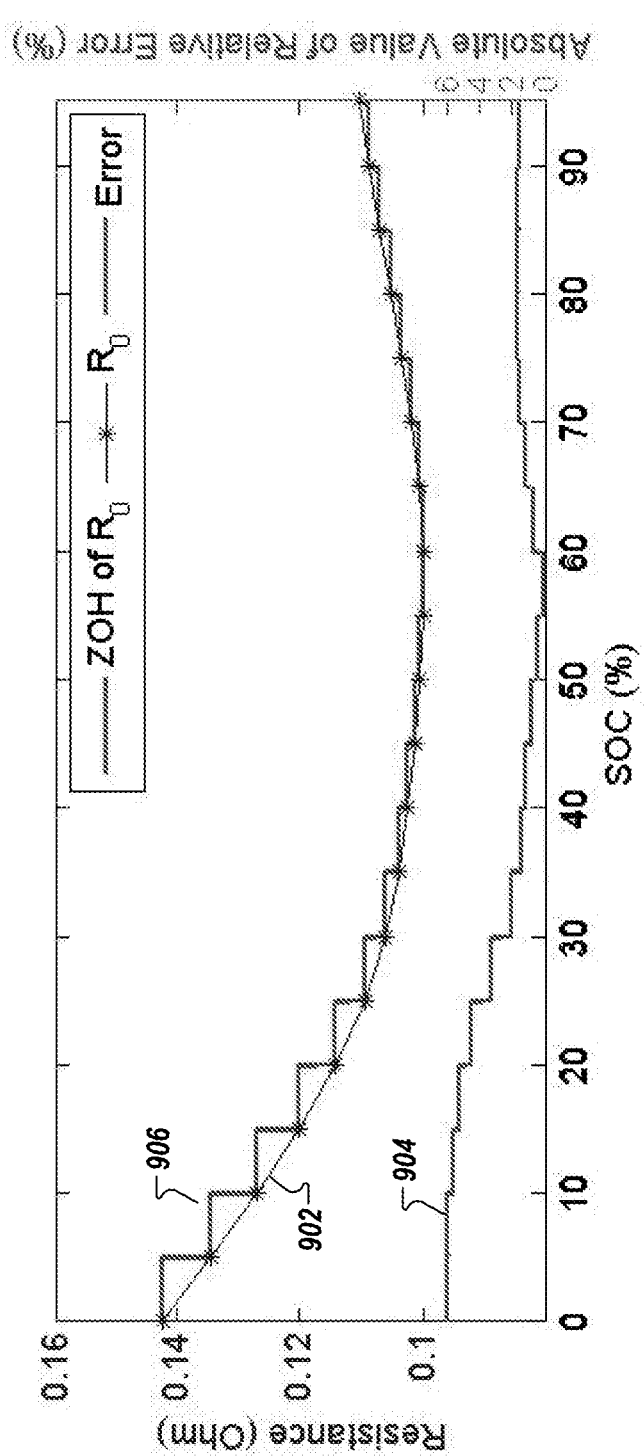
FIG. 9 is a schematic that shows an identified resistance value of the Thevenin's equivalent circuit model versus the SOC according to one example.

The resistor, $R_0(SOC)$, profile is shown in FIG. 9. $R_0$ is large when the battery is nearly fully discharged (low SOC) due to the low ions count. Therefore, there is no large current drawn from the battery. $R_0$ decreases as the ions count increases inside the battery. The ions count increases when SOC increases. $R_0$ drops in the mid SOC region due to the increase in the ions count. SOC continues to increase to a point where the battery has a high ions count. A high ions count in the battery make it harder for the current to flow, and therefore there are a slight increase in the resistance $R_0$ for high SOC.

Figure 10:
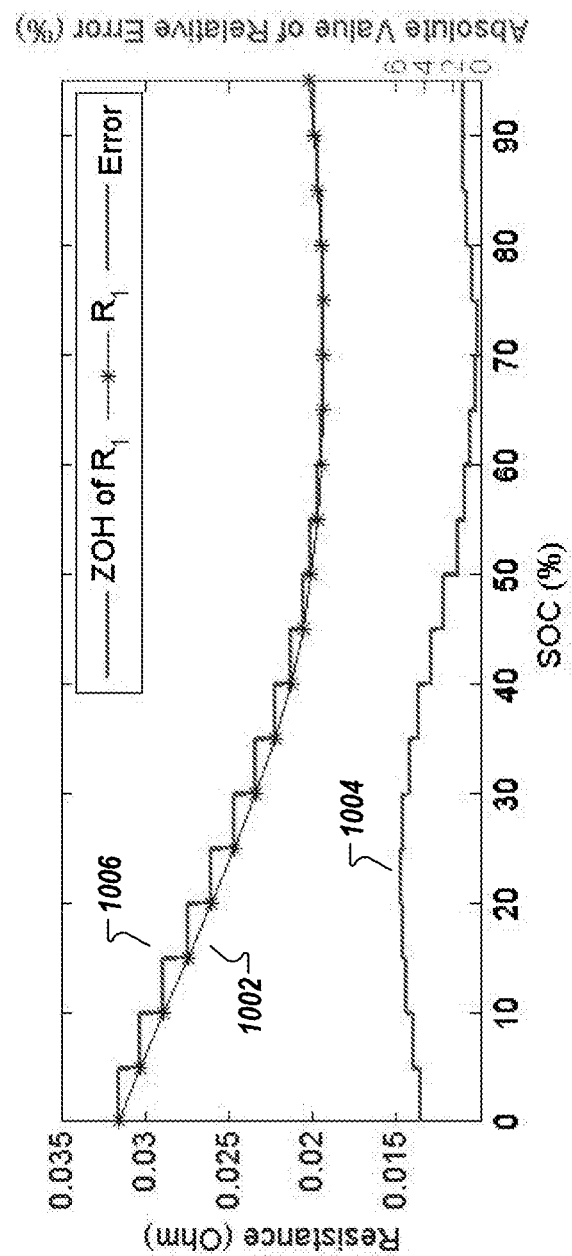
FIG. 10 is a schematic that shows a second resistance value versus the SOC according to one example.

In FIGS. 9 and 10, the x-axis represents the battery state of charge. In trace 902, the y-axis represents a resistance $R_0$ in Ohm. The resistor of RC pair, $R_1$, profile is shown as trace 1002 in FIG. 10. The $R_1$ profile is similar to the profile of $R_0$ because they both are the resistance of the Thevinen's circuit model. In trace 1002, the y-axis represents a resistance $R_1$ in Ohm. In trace 904, the y-axis represents an absolute value of relative error. In trace 906, the y-axis represents the ZOH. In trace 1004, the y-axis represents an absolute value of relative error. In trace 1006, the y-axis represents the ZOH.

Figure 11:
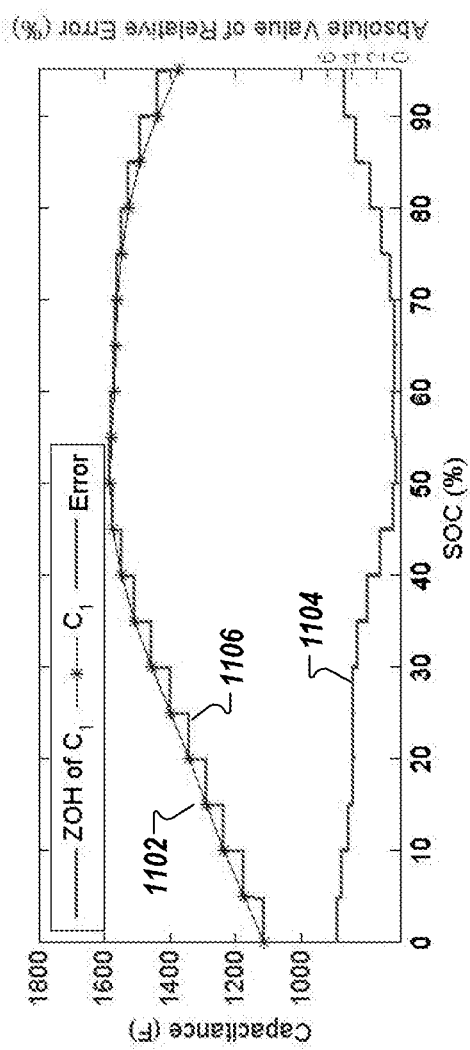
FIG. 11 is a schematic that shows identified capacitance values versus the SOC of the battery according to one example.
Figure 12:
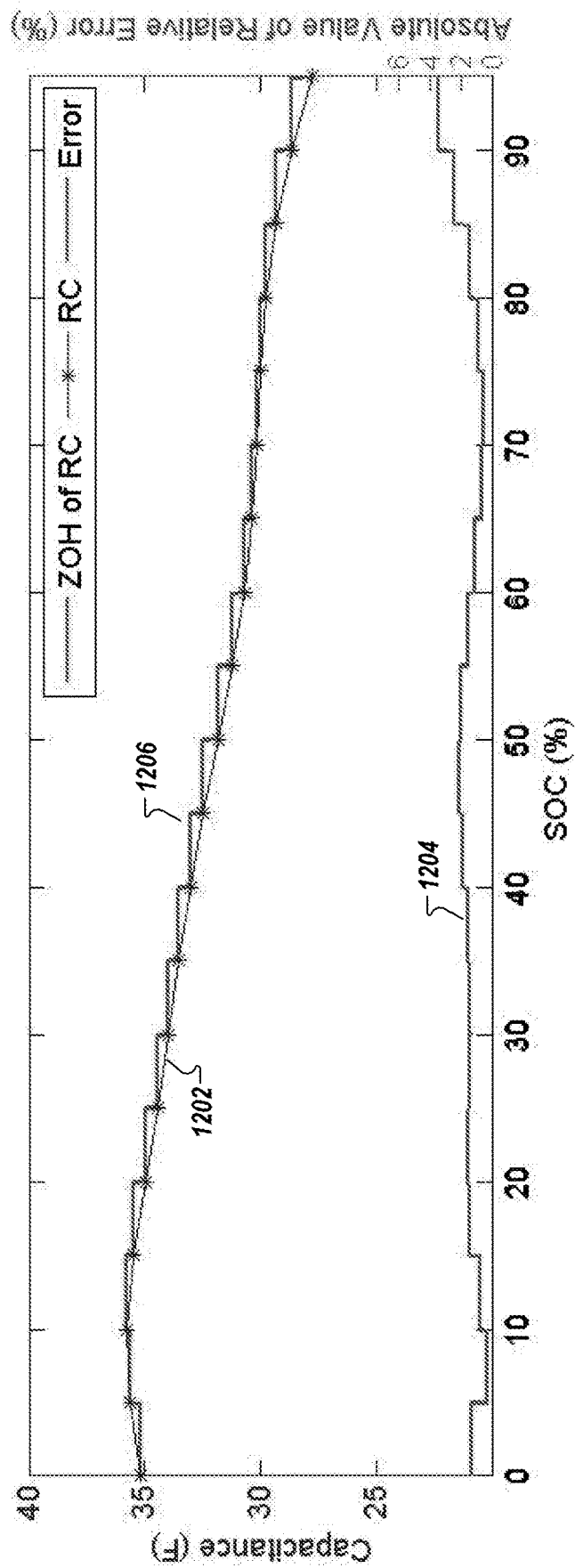
FIG. 12 is a schematic that shows identified RC values versus the SOC of the battery according to one example.

The capacitance of RC pair, $C_1$, profile is shown in FIG. 11. Theoretically, the RC time constant of the battery remains constant or linear with different SOC, which is shown in FIG. 12 as trace 1202. Thus, the $C_1$ profile is lower when the battery is fully charged and fully discharged, which makes the product of the RC pair remains linear. The y-axis in traces 1102, 1104, 1106, represents a capacitance, an error, and the ZOH of the $C_1$, respectively. The y-axis in traces 1202, 1204, 1206, represents a capacitance, an absolute value of relative error, and the ZOH of the RC, respectively.

The condition number at different regions ($D_1$, $D_2$, $D_3$, $D_4$) and different SOC are listed in Table 1. The condition number in $D_1$ and $D_3$ is substantially smaller than the condition number in $D_2$ and $D_4$. Also, the linear regression can accurately identify the correct parameters in $D_1$ and $D_3$ but not in $D_2$ and $D_4$ due to the set of data including enough information or not. Therefore, the set of data belonging to the $D_1$ or $D_3$ region are effective data, the set of data belonging to the $D_2$ and $D_4$ regions are ineffective data as described previously herein.

Figure 13:
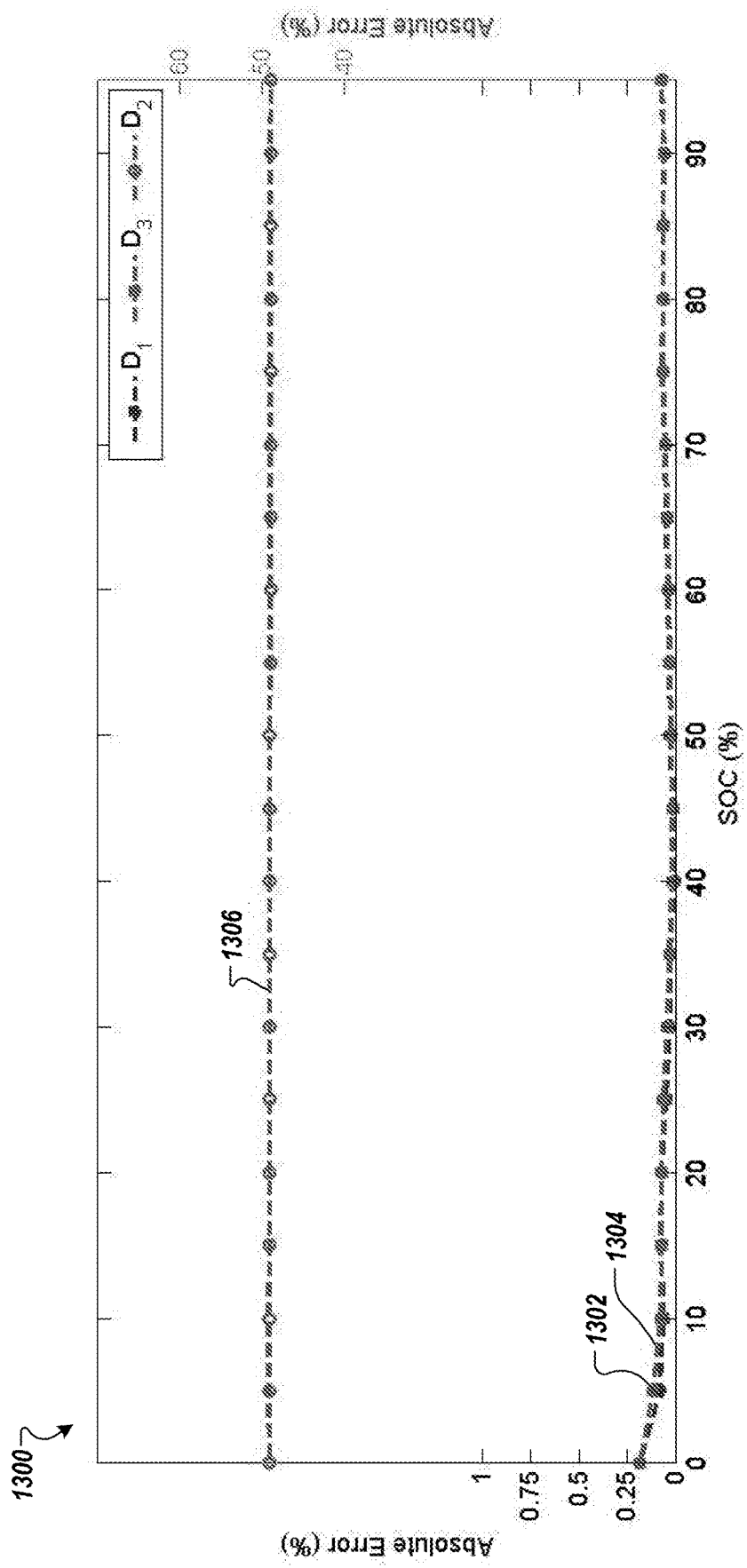
FIG. 13 is a graph that shows the absolute value of relative error for the identified resistance value versus the SOC of the battery according to one example.

The identification result of $R_0$ is plotted in FIG. 13. In Graph 1300, the x-axis presents different SOC values. In $D_1$ and $D_3$, the error of $R_0$ at different SOC are lower than 0.2% as shown by traces 1302 and 1304, respectively. However, the absolute relative values error in $D_4$ is about 49% as shown by trace 1306. Note that the parameter identification cannot be applied in $D_4$ due to the condition number being infinity and the matrix inverse to find the parameter values is undefined.

Figure 14:
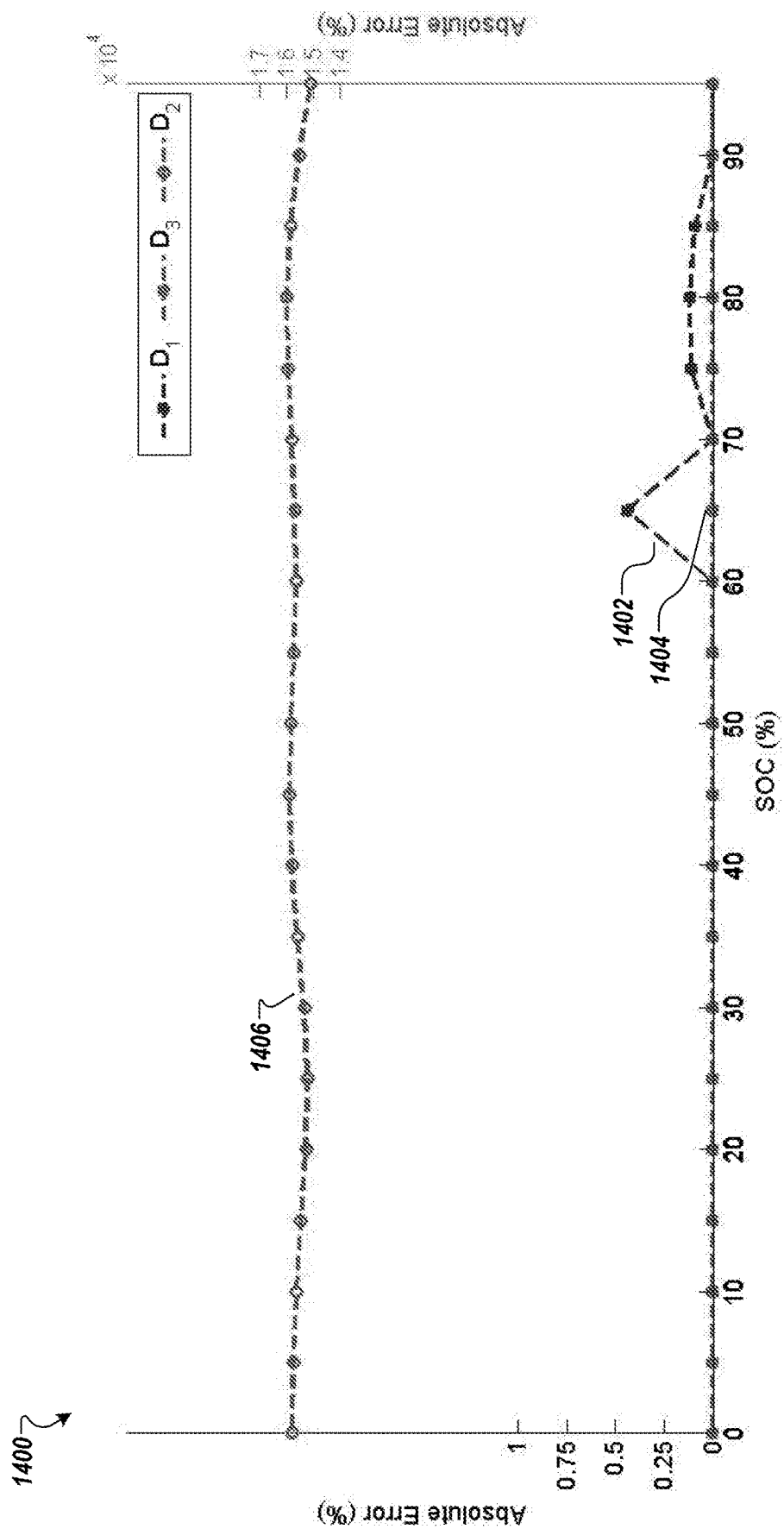
FIG. 14 is a graph that shows the absolute value of relative error for the second resistance value versus the SOC of the battery according to one example.

The identification results of $R_1$ using data from various phases of the charging/discharging are shown in schematic 1400 of FIG. 14. The identification results of $R_1$ are both accurate in $D_1$, $D_3$ as shown by traces 1402 and 1404, respectively. The absolute value of relative error is almost zero except for some SOC in $D_1$. However, the error is still lower than 0.5%. Alternatively, the absolute value of relative error in $D_2$ is very inaccurate, the value is about 15000% as shown by trace 1406.

Figure 15:
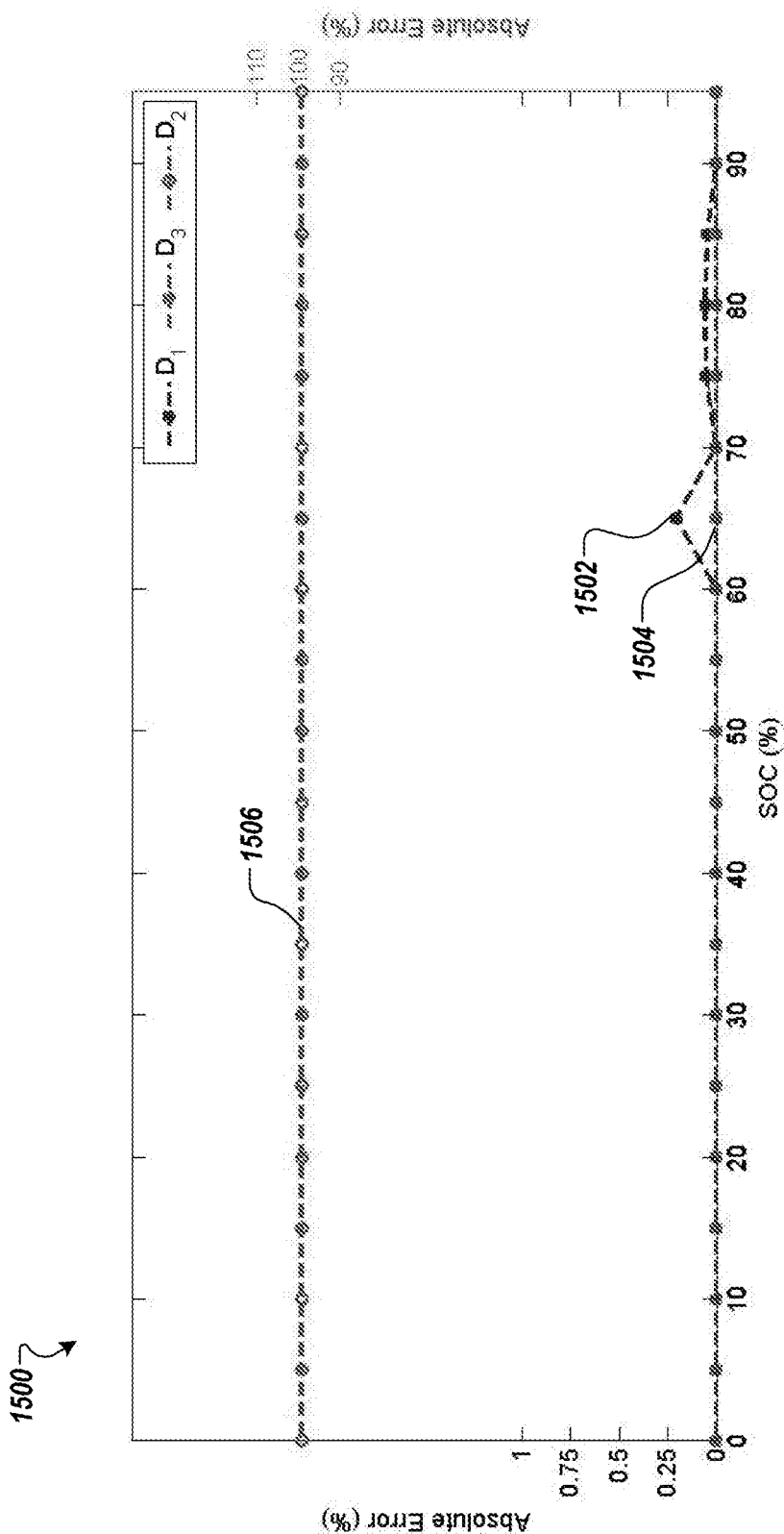
FIG. 15 is a graph that shows the absolute value of relative error for the capacitance versus the SOC of the battery according to one example.

The exemplary identification results for $C_1$ based on the methodologies described herein are shown in schematic 1500 of FIG. 15. The results for $C_1$ show similar results to $R_0$ and $R_1$. The absolute relative error value is almost zero at different SOC in $D_1$, $D_3$ as shown by traces 1502 and 1504, respectively. The error is about 0.2%, which is very small. However, the absolute relative error value is about 99% in $D_2$ as shown by trace 1506.

Figure 16:
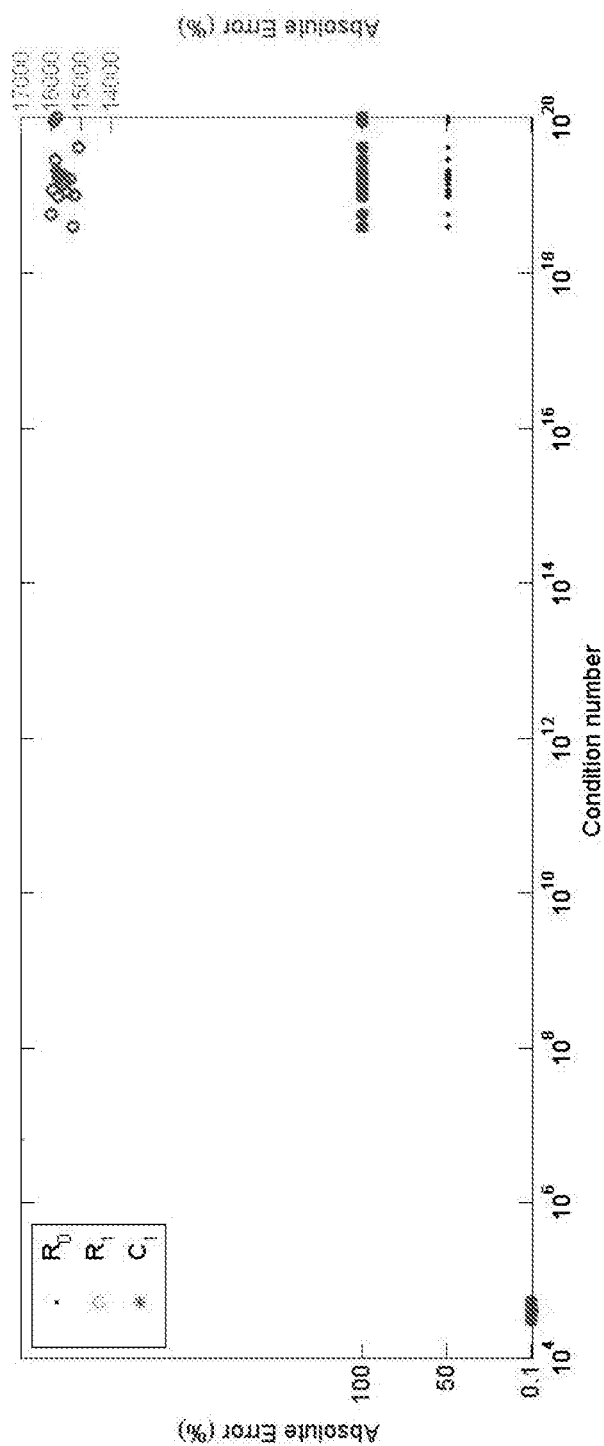
FIG. 16 is a schematic that shows the performance of the circuit model for various condition number according to one example.
Figure 17:
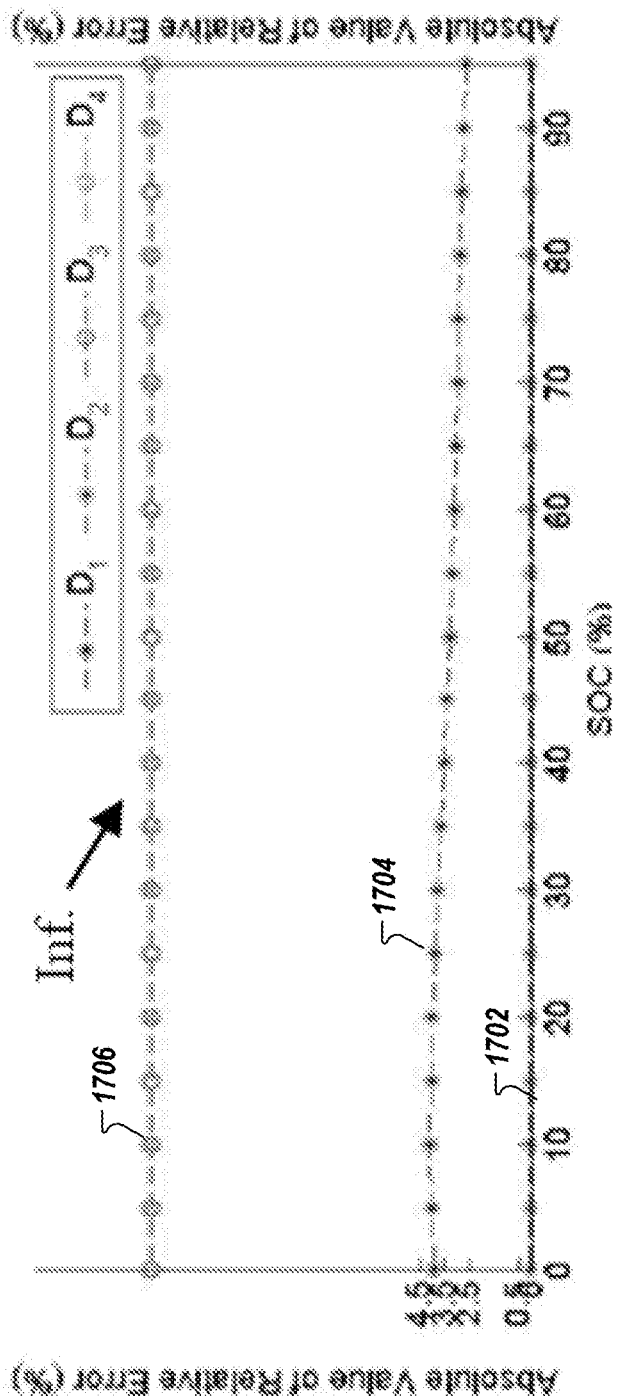
FIG. 17 is a schematic that shows the absolute value of relative error of an equivalent resistance according to one example.

The relationships between the identification performance, absolute value of relative error, and condition number of $R_0$, $R_1$, $C_1$ are shown in FIG. 16.

There are two groups in the relationship of $R_0$. A first group presents the relationship of $D_1$ and $D_3$ which has low condition number and good performance. Another group presents the relationship of $D_2$, alternatively, which has a high condition number and poor performance. In other words, the identification is accurate when the condition number is low.

Therefore, the accuracy of identification is highly related to the condition number. The identification is very accurate when the condition number is low, which is in the $D_1$ and $D_3$ regions. However, the identification fails in the $D_2$ region, which is associated with a very high condition number.

Though data belonging to the $D_2$ and $D_4$ regions are ineffective data because of the high condition number, some component values can still be identified in the $D_2$ region, where the battery follows Ohm's law. Hence, $R_{all}$ can be identified correctly in $D_2$, but $R_{all}$ cannot be further separated into $R_0$ and $R_1$. The identification result shows that the absolute value of relative error in $D_2$ is about 0.06% as shown by trace 1702. However, the absolute value is about 4% in $D_1$ as shown by trace 1704 because the reactance of $C_1$ of RC pair affects the linearity of Ohm's law. Note that the Ohm's law fails in $D_3$ and $D_4$ because the load current equals to zero (traces 1706, 1708).

A system which includes the features in the foregoing description provides numerous advantages to users. In particular, the condition number can be used as an index to successfully evaluate and separate effective data and ineffective data, which helps to derive accurate parameter values and improve the accuracy of model-based battery related estimation algorithm. The condition number is relatively small in $D_1$ and $D_3$ compared to $D_2$. Therefore, data acquired in the $D_1$ and $D_3$ are effective data and can be used to accurately determine the parameters of the circuit model. All the parameters, $R_0$, R and C, can be correctly identified through linear regression approach in $D_1$ and $D_3$, which are defined as effective data. However, only $R_{all}$, which is the summation of all the resistance in the circuit but cannot be further separated into $R_0$ and $R_1$, can be identified in the linear region $D_2$. In addition, all the parameters, $R_0$, $R_1$ and C, cannot be identified in $D_4$. Therefore, the effective data can be found through small condition number. Effective data can help identify accurate components in the Thevenin's equivalent circuit model.

In one implementation, the functions and processes of the data management engine 104 may be implemented by a computer 1826. Next, a hardware description of the computer 1826 according to exemplary embodiments is described with reference to FIG. 18. In FIG. 18, the computer 1826 includes a CPU 1800 which performs the processes described herein. The process data and instructions may be stored in memory 1802. These processes and instructions may also be stored on a storage medium disk 1804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1826 communicates, such as a server or computer.

Further, the claimed advancements may be provided as a utility application, background daemon, or component of an operating system, or combination thereof, executing in conjunction with CPU 1800 and an operating system such as Microsoft® Windows®, UNIX®, Oracle® Solaris, LINUX®, Apple macOS® and other systems known to those skilled in the art.

In order to achieve the computer 1826, the hardware elements may be realized by various circuitry elements, known to those skilled in the art. For example, CPU 1800 may be a Xenon® or Core® processor from Intel Corporation of America or an Opteron® processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

The computer 1826 in FIG. 18 also includes a network controller 1806, such as an Intel Ethernet PRO network interface card from Intel Corporation of America, for interfacing with network 1824. As can be appreciated, the network 1824 can be a public network, such as the Internet, or a private network such as LAN or WAN network, or any combination thereof and can also include PSTN or ISDN sub-networks. The network 1824 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1826 further includes a display controller 1808, such as a NVIDIA® GeForce® GTX or Quadro® graphics adaptor from NVIDIA Corporation of America for interfacing with display 1810, such as a Hewlett Packard® HPL2445w LCD monitor. A general purpose I/O interface 1812 interfaces with a keyboard and/or mouse 1814 as well as an optional touch screen panel 1816 on or separate from display 1810. General purpose I/O interface also connects to a variety of peripherals 1818 including printers and scanners, such as an OfficeJet® or DeskJet® from Hewlett Packard.

The general purpose storage controller 1820 connects the storage medium disk 1804 with communication bus 1822, which may be an ISA, EISA, VESA, PCI, or similar, for interconnecting all of the components of the computer 1826. A description of the general features and functionality of the display 1810, keyboard and/or mouse 1814, as well as the display controller 1808, storage controller 1820, network controller 1806, and general purpose I/O interface 1812 is omitted herein for brevity as these features are known.

Obviously, numerous modifications and variations are possible in light of the above teachings. It is therefore to be understood that within the scope of the appended claims, the invention may be practiced otherwise than as specifically described herein.

The features of the present disclosure provide a multitude of improvements in the technical field of battery management. For example, features of the present disclosure allow for identification of effective data which in turn allow identifying an accurate model in real time. In addition, filtering ineffective data minimizes parameters identification errors which in turn improve SOC/SOH estimation. An improved SOC/SOH estimation leads to the full utilization of the battery and prolong the battery usage period. Thus, the system and associated methodology described herein amount to significantly more than an abstract idea based on the improvements and advantages described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for estimating a state of a battery, the method comprising:
    acquiring battery information from a sensor associated with the battery, the battery information including at least a terminal voltage and a load current;
    determining a phase of a battery cycle based on at least the load current and a rate of change of the terminal voltage,
    classifying, using processing circuitry, the battery information as effective data when the rate of change of the terminal voltage is greater than a predetermined threshold;
    identifying, using the processing circuitry, one or more parameters of a circuit model associated with the battery based on the effective data and the determined phase of the battery cycle; and
    generating, using the processing circuitry, an estimation of the state of the battery using the one or more parameters in the circuit model.

2. The method of claim 1, further comprising:
    determining a derivative of the terminal voltage;
    comparing the derivative with the predetermined threshold; and
    categorizing the battery information as the effective data when the derivative is greater than the predetermined threshold.

3. The method of claim 2, wherein the predetermined threshold is a function of at least a category of the battery.

4. The method of claim 1, wherein the one or more parameters are identified using linear regression.

5. The method of claim 1, wherein the battery is a lithium-ion battery.

6. The method of claim 1, wherein the one or more parameters include at least an ohmic resistor, and at least one RC pair.

7. The method of claim 1, wherein the state of the battery represents a state of charge.

8. An apparatus for estimating a state of a battery, the apparatus comprising:
- a sensor configured to acquire battery information from the battery, the battery information including at least a terminal voltage and a load current; and
- processing circuitry configured to
    - determine a phase of a battery cycle based on at least the load current and a rate of change of the terminal voltage,
    - classify the battery information as effective data when the rate of change of the terminal voltage is greater than a predetermined threshold,
    - identify one or more parameters of a circuit model associated with the battery based on the effective data and the determined phase of the battery cycle, and
    - generate an estimation of the state of the battery using the one or more parameters in the circuit model.

9. The apparatus of claim 8, wherein the processing circuitry is further configured to:
- determine a derivative of the terminal voltage;
- compare the derivative with the predetermined threshold; and
- categorize the battery information as the effective data when the derivative is greater than the predetermined threshold.

10. The apparatus of claim 9, wherein the predetermined threshold is a function of at least a category of the battery.

11. The apparatus of claim 8, wherein the one or more parameters are identified using linear regression.

12. The apparatus of claim 8, wherein the battery is a lithium-ion battery.

13. The apparatus of claim 8, wherein the one or more parameters include at least an ohmic resistor, and at least one RC pair.

14. The apparatus of claim 8, wherein the state of the battery represents a state of charge.

15. A circuit model for a battery comprising:
- one or more electrical components;
- wherein the one or more electrical components are identified based on effective data, the effective data being classified based on a phase of a battery cycle during which battery information is acquired from a sensor associated with the battery, the battery information including at least a terminal voltage and a load current, the phase of the battery cycle being determined based on at least the load current and a rate of change of the terminal voltage, and
- wherein the battery information is classified as the effective data when the rate of change of the terminal voltage is greater than a predetermined threshold.

16. The circuit model of claim 15, wherein the one or more electrical components are identified using linear regression.

17. The circuit model of claim 15, wherein the one or more electric components include at least an ohmic resistor, and at least one RC pair.

* * * * *